US011155153B2

(12) United States Patent
Cafeo et al.

(10) Patent No.: US 11,155,153 B2
(45) Date of Patent: Oct. 26, 2021

(54) ENERGY SHARING SYSTEM AND METHOD FOR A VEHICLE

(71) Applicant: GM Global Technology Operations LLC, Detroit, MI (US)

(72) Inventors: John A. Cafeo, Farmington, MI (US); Madhusudan Raghavan, West Bloomfield, MI (US); Wei Li, Troy, MI (US); Anil Bika, Rochester Hills, MI (US); Azeem Sarwar, Rochester Hills, MI (US); Ran Y. Gazit, Ra'anana (IL); Winson Ng, San Jose, CA (US); Ryan C. Sekol, Grosse Pointe Woods, MI (US); Thomas A. Yersak, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 501 days.

(21) Appl. No.: 15/995,640

(22) Filed: Jun. 1, 2018

(65) Prior Publication Data
US 2019/0366830 A1 Dec. 5, 2019

(51) Int. Cl.
*B60K 6/42* (2007.10)
*B60R 16/03* (2006.01)
*H02J 7/00* (2006.01)
*B60R 16/04* (2006.01)
*B60K 6/28* (2007.10)

(52) U.S. Cl.
CPC ............. *B60K 6/42* (2013.01); *B60K 6/28* (2013.01); *B60R 16/03* (2013.01); *B60R 16/04* (2013.01); *H02J 7/0022* (2013.01)

(58) Field of Classification Search
CPC .. B60K 6/42; B60K 6/28; B60R 16/03; B60R 16/04; H02J 7/0022
See application file for complete search history.

(56) References Cited

U.S. PATENT DOCUMENTS

| 9,778,653 | B1 | 10/2017 | McClintock et al. |
| 10,220,717 | B2 | 3/2019 | Ricci |
| 10,391,872 | B2 | 8/2019 | Gaither et al. |
| | | (Continued) | |

OTHER PUBLICATIONS

U.S. Appl. No. 15/877,414, filed Jan. 23, 2018, Wei et al.
(Continued)

*Primary Examiner* — Richard V Muralidar
(74) *Attorney, Agent, or Firm* — Harness, Dickey & Pierce, P.L.C.

(57) ABSTRACT

A vehicle including a hybrid battery pack includes a first battery pack and a second battery pack. The first battery pack has a higher energy density than the second battery pack. The second battery pack has a higher power density than the first battery pack. A power inverter module is connected between the hybrid battery pack and a motor generator unit (MGU) that is connected to a powertrain of the vehicle. The power inverter module is configured to regulate power flow between the hybrid battery pack and the MGU. A battery management module is configured to: control switching of the power inverter module; selectively charge and discharge at least one of the first battery pack and the second battery pack; and selectively charge the first battery pack with power from the second battery pack.

19 Claims, 10 Drawing Sheets

(56) References Cited

U.S. PATENT DOCUMENTS

| | | | |
|---|---|---|---|
| 10,532,663 B2 | 1/2020 | Ricci | |
| 2010/0133900 A1* | 6/2010 | King | ................ B60L 55/00 |
| | | | 307/9.1 |
| 2011/0025267 A1 | 2/2011 | Kamen et al. | |
| 2011/0204720 A1 | 8/2011 | Ruiz et al. | |
| 2013/0141045 A1* | 6/2013 | Karim | ................ H02J 7/0042 |
| | | | 320/110 |
| 2014/0088804 A1 | 3/2014 | Hyde et al. | |
| 2016/0029342 A1 | 1/2016 | Winand et al. | |
| 2017/0010332 A1 | 1/2017 | Kagami et al. | |
| 2017/0274780 A1 | 9/2017 | de Hoog et al. | |
| 2019/0366831 A1 | 12/2019 | Cafeo et al. | |

OTHER PUBLICATIONS

U.S. Appl. No. 15/877,413, filed Jan. 23, 2018, Wei et al.
U.S. Appl. No. 15/877,416, filed Jan. 23, 2018, Wei et al.
K. Zaghib et al.; "Safe and fast-charging Li-ion battery with long shelf life for power applications"; Journal of Power Sources 196 (2011); available online Nov. 24, 2010; pp. 3949-3954.
U.S. Appl. No. 16/153,884, filed Oct. 8, 2018, Tarnowsky et al.

* cited by examiner

ENERGY SHARING SYSTEM AND METHOD FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an energy sharing system and method for a hybrid battery pack and more particularly to managing power flow from the hybrid battery pack based on the state-of-charge of the battery pack.

A powertrain transfers torque from one or more torque-generating devices through a transmission to a driveline. Torque-generating devices may include internal combustion engines and motor generator units (MGUs).

Hybrid vehicles may include an internal combustion engine and one or more MGUs. Electric vehicles may include one or more MGUs and no internal combustion engine. Other types of vehicles may include an internal combustion engine and no MGUs.

An MGU can operate as a motor to generate a torque input to the transmission independently of a torque input from the internal combustion engine. An MGU can also operate as a generator to transform vehicle kinetic energy to electrical energy that is storable in a battery pack. A battery management module regulates power flow between a charge station, the battery pack, the MGU, and accessory loads.

SUMMARY

In a feature, a vehicle is described. The vehicle includes a hybrid battery pack including a first battery pack and a second battery pack. The first battery pack has a higher energy density than the second battery pack. The second battery pack has a higher power density than the first battery pack. A power inverter module is connected between the hybrid battery pack and a motor generator unit (MGU) that is connected to a powertrain of the vehicle. The power inverter module is configured to regulate power flow between the hybrid battery pack and the MGU. A battery management module is configured to: control switching of the power inverter module; selectively charge and discharge at least one of the first battery pack and the second battery pack; and selectively charge the first battery pack with power from the second battery pack.

In further features, the vehicle further includes a first switch and a second switch. The first switch is connected between the power inverter module and the second battery pack and: (i) when open, disconnects the second battery pack from at least one of the power inverter module and a charging station; and (ii) when closed, connects the second battery pack and at least one of the power inverter module and the charging station. The second switch is connected between the power inverter module and the first battery pack and: (i) when open, disconnects the first battery pack from at least one of the power inverter module and the charging station; and (ii) when closed, connects the first battery pack and at least one of the power inverter module and the charging station.

In further features, the battery management module is further configured to: determine a first state-of-charge (SOC) of the first battery pack; and determine a second SOC of the second battery pack.

In further features, the battery management module is configured to, based on at least one of the first SOC and the second SOC, charge and discharge at least one of the first battery pack and the second battery pack.

In further features, the battery management module is configured to discharge the second battery pack when: (i) the vehicle is in a driving mode; (ii) the second SOC of the second battery pack is greater than a first predetermined SOC; and (iii) the first SOC of the first battery pack is less than a second predetermined SOC; and the battery management module is configured to charge the first battery pack with power discharged from the second battery pack when: (i) the vehicle is in the driving mode; (ii) the second SOC of the second battery pack is greater than a third predetermined SOC; and (iii) the first SOC of the first battery pack is greater than a fourth predetermined SOC.

In further features, the battery management module is configured to discharge the first battery pack in response to determining that the second SOC of the second battery pack is less than the first predetermine SOC.

In further features, the battery management module is configured to determine whether the vehicle is plugged into a charging station; and the battery management module is configured to determine a level of the charge station in response to determining that the vehicle is plugged into the charging station.

In further features, the battery management module is configured to, in response to determining that the charge station is a level three charging station, determine whether the first SOC of the first battery pack is less than a first predetermined SOC for the first battery pack; the battery management module is configured to charge at least one of the second battery pack and the first battery pack with power from the charging station in response to determining that the first SOC of the first battery pack is less than the first predetermined SOC for the first battery pack; and the battery management module is configured to charge the second battery pack with power from the charging station in response to determining that the first SOC of the first battery pack is greater than the first predetermined SOC for the first battery pack.

In further features, the battery management module is configured to, in response to determining that the charging station is not a level three charging station, determine whether the first SOC of the first battery pack is less than a second predetermined SOC for the first battery pack, where the second predetermined SOC is greater than the first predetermined SOC; the battery management module is configured to charge the first battery pack with power from the charging station in response to determining that the first SOC of the first battery pack is less than the second predetermined SOC for the first battery pack; and the battery management module is configured to charge the second battery pack in response to determining that the first SOC of the first battery pack is greater than or equal to the second predetermined SOC for the first battery pack.

In further features, the battery management module is configured to, in response to determining that the vehicle is not plugged into the charging station, determine whether the second SOC of the second battery pack is greater than a first predetermined SOC for the second battery pack and whether the first SOC of the first battery pack is less than a second predetermined SOC for the first battery pack; and the battery management module is configured to, in response to determining that at least one of (a) the second SOC of the second battery pack is less than the first predetermined SOC for the second battery pack and (b) the first SOC of the first battery pack is greater than the second predetermined SOC for the first battery pack, at least one of (i) disable discharging of the second battery pack and (ii) disable discharging of the first battery pack.

In further features, the battery management module is configured to: determine whether an energy request has been received in response to determining that the second SOC of the second battery pack is greater than the first predetermined SOC for the second battery pack and the first SOC of the first battery pack is less than the second predetermined SOC for the first battery pack; and in response to determining that the energy request has been received, at least one of (i) enable charging of the first battery pack with power from the second battery pack and (ii) selectively discharge the second battery pack to satisfy the energy request.

In further features, an energy share system is described. The energy share system includes a second vehicle including a battery pack and a second battery management module, where at least one of: the second battery management module is configured to selectively charge the battery pack with power received from the hybrid battery pack of the vehicle; and the battery management module is configured to selectively charge the hybrid battery pack with power received from the battery pack of the second vehicle.

In further features, the energy share system further includes: a first computing device that is associated with the vehicle and is configured to, in response to receiving a first input from a user, transmit an energy request and a first location of the vehicle; a second computing device is associated with the second vehicle and is configured to: transmit a second location of the second vehicle; and an amount of energy available for sale from the battery pack of the second vehicle.

In further features, the energy share system further includes an energy share server. The energy share server is configured to: receive the energy request, the first location of the vehicle, the second location of the second vehicle, and the amount of energy available for sale from the battery pack of the second vehicle; generate a list of energy sellers' vehicles in response to the receipt of the energy request; and transmit the list to the first computing device. The first computing device is configured to: display the list on a display of the first computing device; and transmit, to the energy share server, an indication of selection of the second vehicle in response to receipt of user input at the first computing device indicative of the selection of the second vehicle from the list. The battery management module is configured to selectively charge the hybrid battery pack with power received from the battery pack of the second vehicle in response to signals from the energy share server.

In further features, the energy share server is configured to limit the list of energy sellers' vehicles to energy sellers' vehicles that are within a predetermined distance of a location of the vehicle.

In further features, the energy request includes the location of the vehicle and the predetermined distance, where the first computing device is configured to adjust the predetermined distance based on user input to the first computing device.

In further features, the second vehicle includes a charge port; the charge port controls access to the battery pack and includes an electronic lock; the energy share server selectively transmits an electronic access key to the first computing device in response to the indication of selection of the second vehicle in response to receipt of user input at the first computing device indicative of the selection of the second vehicle from the list; and the electronic lock unlocks in response to the electronic access key.

In further features, the electronic access key includes an amount of energy to be transferred from second battery pack, and the battery management module is configured to charge the hybrid battery pack with power received from the battery pack of the second vehicle until an amount of energy transferred from the battery pack is equal to the amount of energy to be transferred from the battery pack.

In further features, the electronic access key includes predetermined times between which the electronic access key is valid. The battery management module is configured to charge the hybrid battery pack with power received from the battery pack of the second vehicle only when a present time is between the predetermined times.

In a feature, a method for a vehicle includes: regulating, by a power inverter module, power flow between a hybrid battery pack and a motor generator unit (MGU). The hybrid battery pack includes a first battery pack and a second battery pack, the first battery pack has a higher energy density than the second battery pack, and the second battery pack has a higher power density than the first battery pack. The method further includes: controlling switching of the power inverter module; selectively charging and discharging at least one of the first battery pack and the second battery pack; and selectively charging the first battery pack with power from the second battery pack.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A hybrid or electric vehicle may be propelled by an MGU that is powered by a battery pack. The battery pack may be configured to charge and discharge quickly (high power battery pack) or to charge and discharge not as quickly (high energy battery pack) but to provide a longer range per unit of volume or weight.

A hybrid battery pack includes both a high power battery pack and a high energy battery pack so that a vehicle may have one battery pack that is quick to charge and discharge and that also has a longer range. A battery management module manages vehicle power requests, prioritizes vehicle power requests based on a state-of-charge (SOC) of the high power battery pack, and a state-of-charge (SOC) of the high energy battery pack.

Figure 1:
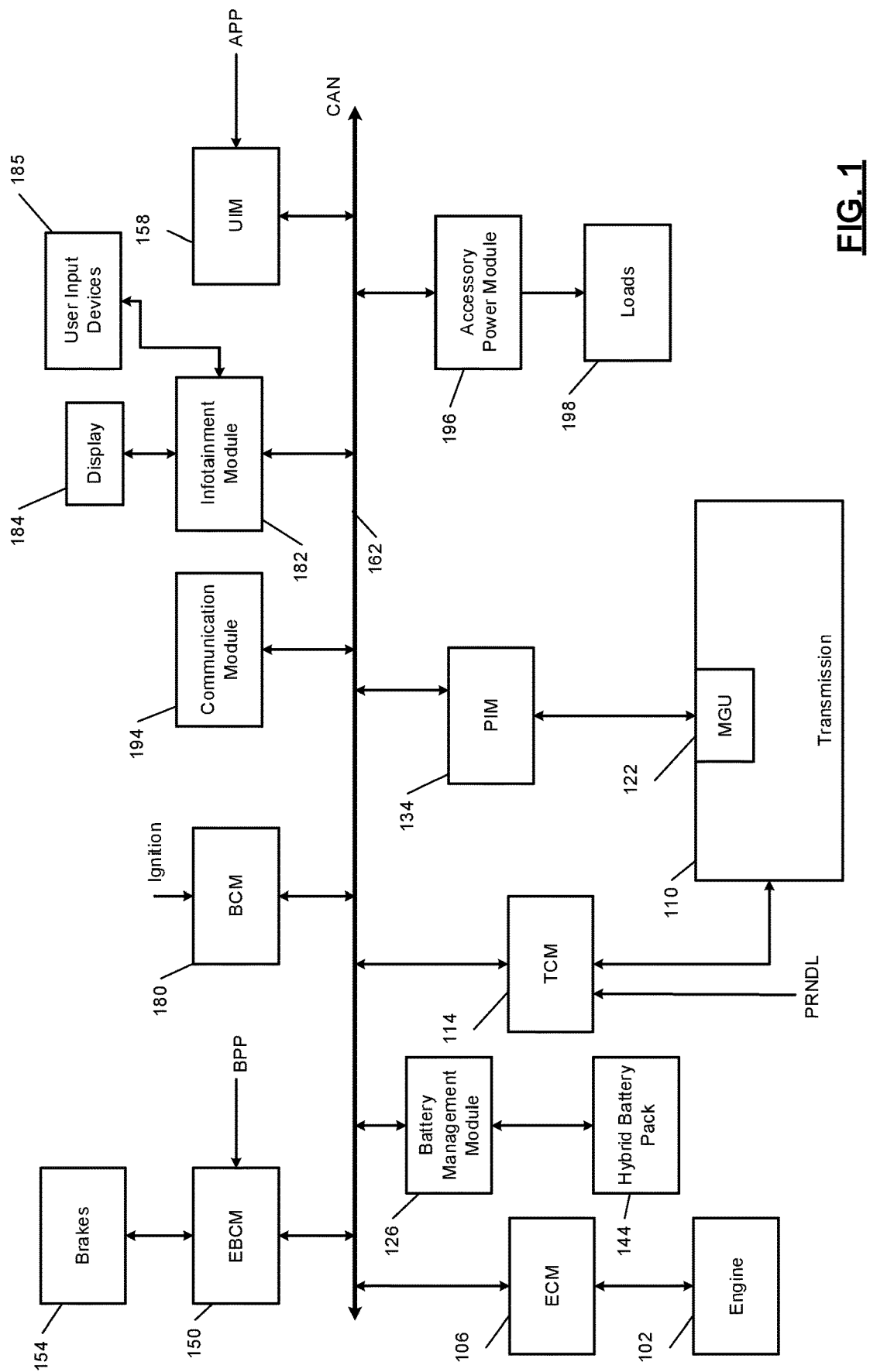
FIG. 1 is a functional block diagram of an example vehicle system.

Referring now to FIG. 1, a functional block diagram of an example vehicle system is presented. While a hybrid vehicle system is shown and will be described, the present disclosure is also applicable to non-hybrid vehicles, electric vehicles, fuel cell vehicles, and other types of vehicles that include one or more MGUs.

An engine 102 combusts an air/fuel mixture to generate drive torque. An engine control module (ECM) 106 controls operation of the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. The ECM 106 may also control one or more other electric motors such as an electric motor of a switchable water pump, and an electric oil pump.

The engine 102 may output torque to a transmission 110. A transmission control module (TCM) 114 controls operation of the transmission 110. For example only, the TCM 114 may control gear selection within the transmission 110 and one or more torque transfer devices (e.g., a torque converter, one or more clutches, etc.) within the transmission 110.

The vehicle may include one or more motors or motor generator units (MGUs). For example only, the MGU 122 may be implemented within the transmission 110 as in the example of FIG. 1. The MGU 122 may act as either a generator or as a motor at a given time. When acting as a generator, the MGU 122 converts mechanical energy into electrical energy. The electrical energy may be, for example, used to charge a hybrid battery pack 144 and supply electrical energy to electric components of the vehicle. A battery management module 126 manages charging and discharging of the hybrid battery pack 144. For example, the battery management module 126 controls power flow between the hybrid battery pack 144 the MGU 122, and other loads 198. The battery management module 126 may also charge the hybrid battery pack 144 with power from a utility.

When acting as a motor, the MGU 122 generates torque that may be used, for example, to supplement or replace torque output by the engine 102. While the MGU 122 is shown and discussed as being within the transmission 110, one or more MGUs and/or motor generator units that are external to the transmission 110 may be provided additionally or alternatively.

A power inverter module (PIM) 134 may control the MGU 122. The PIM 134 may be referred to as a transmission power inverter module (TPIM) or a traction power inverter module (TPIM) in various implementations. The PIM 134 converts DC power from the hybrid battery pack 144 into alternating current (AC). For example, the PIM module 134 may convert the DC power from the hybrid battery pack 144 into 3-phase AC power and apply the 3-phase AC power to windings of the MGU 122. The PIM 134 also converts AC power output by the MGU 122, such as during regenerative braking, into DC power and outputs the DC power to charge the hybrid battery pack 144. An electronic brake control module (EBCM) 150 may selectively control brakes 154 of the vehicle. A user interface module (UIM) 158 provides one or more driver inputs to a controller area network (CAN) bus 162. The CAN bus 162 may also be referred to as a car area network bus. The control modules of the vehicle may communicate with each other via the CAN bus 162.

The driver inputs may include, for example, an accelerator pedal position (APP) and one or more other suitable driver inputs. A brake pedal position (BPP) may be provided to the EBCM 150. A position of a park, reverse, neutral, drive lever (PRNDL) may be provided to the TCM 114. The PRNDL position may also be provided to the PIM 134 in various implementations. An ignition state may be provided to a body control module 180. For example only, the ignition state may be input by a driver via an ignition key, button, switch, or other suitable device.

An accessory power module (APM) 196 provides power to accessory loads 198. The APM 196 includes a DC/DC converter that converts power from the DC voltage of the hybrid battery pack 144 into one or more other DC voltages, such as 12 volts. By using the APM 196, the accessory loads 198 do not need to be redesigned to work with the higher voltage output of the hybrid battery pack 144.

An infotainment module 182 controls what is displayed on a display 184. The display 184 may be a touchscreen display in various implementations and transmit signals indicative of user input to the display 184 to the infotainment module 182. The Infotainment module 182 may, additionally or alternatively, receive signals indicative of user input from one or more other user input devices 185, such as one or more switches, buttons, knobs, etc.

A communications module 194 including one or more transceivers that wirelessly receive information and transmit information via one or more antennas of the vehicle. Examples of transceivers include, for example, cellular transceivers, Bluetooth transceivers, WiFi transceivers, satellite transceivers, and other types of transceivers.

A vehicle may include one or more additional control modules that are not shown. One or more of the control modules may be omitted in various vehicles. The control modules may selectively transmit and receive data via the CAN bus 162. In various implementations, two or more control modules may communicate via one or more additional CAN buses (not shown).

Figure 2:
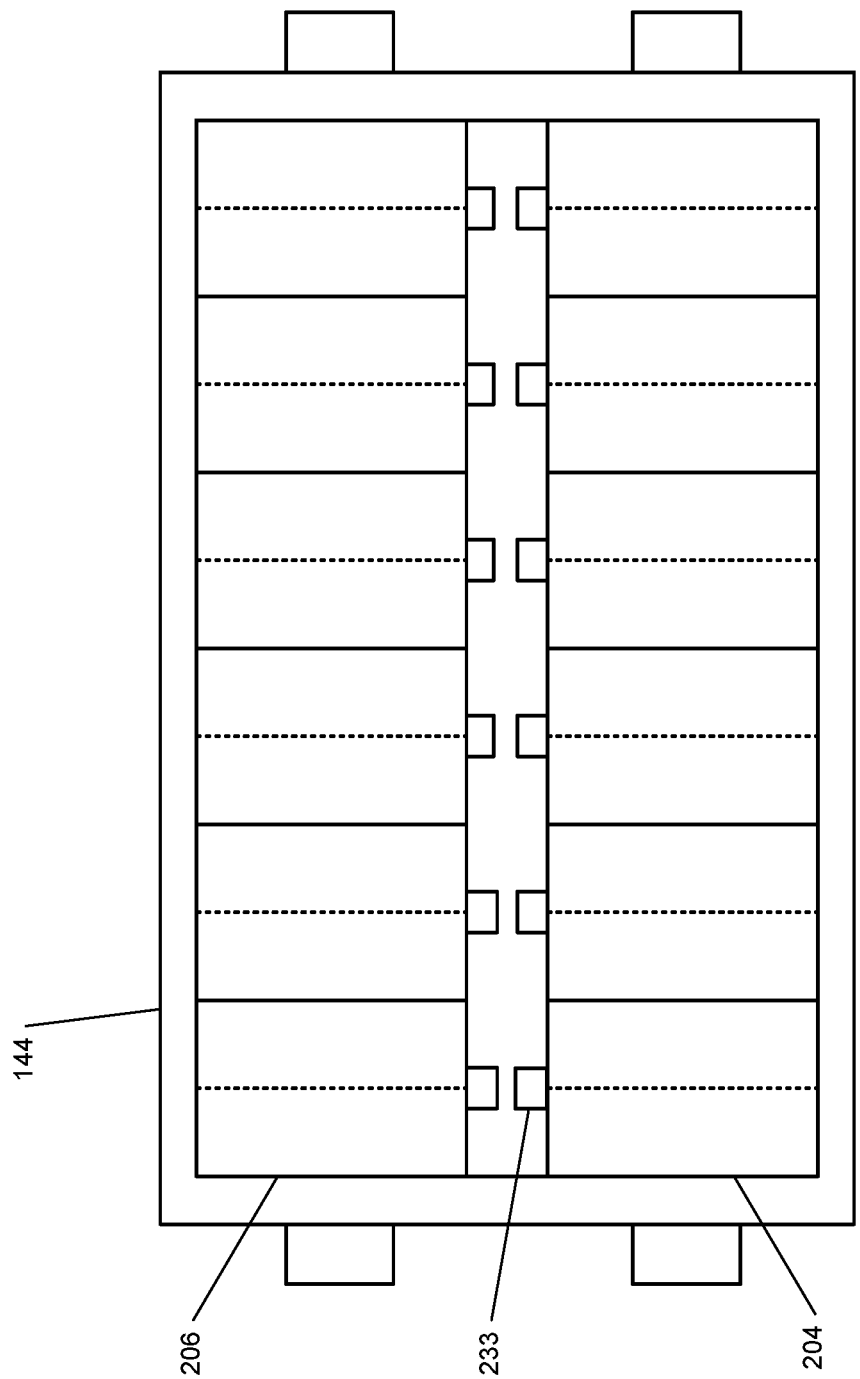
FIG. 2 is a functional block diagram of an example hybrid battery pack.

With reference to FIG. 2, the hybrid battery pack 144 includes a high power battery pack 204 and a high energy battery pack 206. The high energy battery pack 206 has a relatively high energy density relative to the high power battery pack 204 (i.e., energy per unit of weight or per unit of size, such as in kilowatt-hours per kilogram (kWh/kg) or kilowatt-hours per liter (kWh/l)), and therefore extends the range of the vehicle in comparison to a battery system having the high power battery pack 204 but not the high energy battery pack 206. The high energy battery pack 206 may have a relatively high internal resistance, which limits its ability to charge and discharge as quickly as the high power battery pack 204. For example, the high energy battery pack 206 may have an energy density at least 50 percent greater than the energy density of the high power battery pack 204.

In one embodiment, the high energy battery pack 206 includes lithium-metal based energy battery cells with 400 Wh/kg energy density, and the high power battery pack 204 includes lithium-titanate based battery cells of about 100 Wh/kg energy density. In another embodiment, the high energy battery pack 206 includes lithium-ion based energy battery cells with 250 Wh/kg energy density, and the high power battery pack 204 includes lithium-ion based battery cells of about 150 Wh/kg energy density.

The high power battery pack 204 has a relatively high power density relative to the high energy battery pack 206 (i.e., power per unit of size or per unit of weight, such as in kilowatts per kilogram or per liter). For example, the high power battery pack 204 may have a power density at least 100 percent greater than the power density of the high energy battery pack 206. Using allowable charging rate as a rough estimate of the power density of the high power battery pack 204 and the high energy battery pack 206, in an embodiment, the high power battery pack 204 includes battery cells that may charge at a 4C rate for 80 percent (SOC), and the high energy battery pack 206 includes battery cells that may typically charge at about a C/3 rate. The 1C rate corresponds to the current needed to charge the battery from a fully discharged state (0 percent charged) to the fully charged state (100 percent charged) in one hour. The 4C rate corresponds to the current needed to charge the battery from the fully discharged state to the fully charged state in one quarter of an hour, or 15 minutes.

The high power battery pack 204 has the advantage of an ability to accept higher current during charging than the high energy battery pack 206, enabling what may be referred to as a "DC fast" or "Level 3" charge. DC Fast charge may be obtained from a charge source configured to provide relatively high current and that may be, for example, a public charging station. Access to such a charge source enables the vehicle to continue a driving excursion, and provides a quicker partial or full recharge of the high power battery pack 204, as explained herein.

The high power battery pack 204 is configured to provide a predetermined maximum range of the vehicle when fully charged and to be able to receive an amount of power equivalent to a predetermined fraction of that maximum range during a fast charge (i.e., relatively high current charging) within a predetermined duration. For example, the high power battery pack 204 may be configured to provide a predetermined maximum range of 150 miles when fully charged, and be able to receive an amount of power equivalent to 80 percent of the range (i.e., 120 miles) in a 15-minute fast charge. The high power battery pack 204 alone thus provides 270 miles of driving range if discharged from a fully charged state and then given one fast charge to 80 percent of the maximum SOC. Miles of vehicle travel are converted to battery capacity in kilowatt-hours based on vehicle energy consumption per mile. For example, the vehicle may consume energy at a rate of 250 watt-hours per mile.

The high energy battery pack 206 is configured to, in combination with the high power battery pack 204, provide a predetermined maximum driving range. For example, the hybrid battery pack 144 may be configured to provide a maximum driving range of 500 miles, which is greater than or equal to the typical daily mileage of 75 percent of drivers on 361 days of the year.

The nominal voltage of the high power battery pack 204 and the high energy battery pack 206 may be the same or different. The high power battery pack 204 and the high energy battery pack 206 could have a different end of charge voltage and/or a different end of discharge voltage. To use the same PIM 134 between the MGU 122 and the high power battery pack 204 and the high energy battery pack 206, the nominal voltage of the high power battery pack 204 and high energy battery pack 206 may be between 250 and 500 volts (enabling the use of the same insulated gate bipolar transistors (IGBTs)). For the high power battery pack 204 and high energy battery pack 206, the end of discharge voltage should be above a predetermined fraction of an end of charge voltage, such as about 0.55 of the end of charge voltage.

The high power battery pack 204 includes multiple battery cells. The high energy battery pack 206 also includes multiple battery cells. Each battery cell includes an anode and a cathode (indicated on either side of a membrane shown with dashed lines). One or more sensors per cell 233 are in operative communication with each battery cell and are operatively connected to the battery management module 126. The sensors 233 are configured to monitor battery parameters during vehicle operation. For example, the sensors 233 may monitor parameters indicative of the respective SOC of each battery cell, such as voltage, current, temperature, etc.

Figure 3:
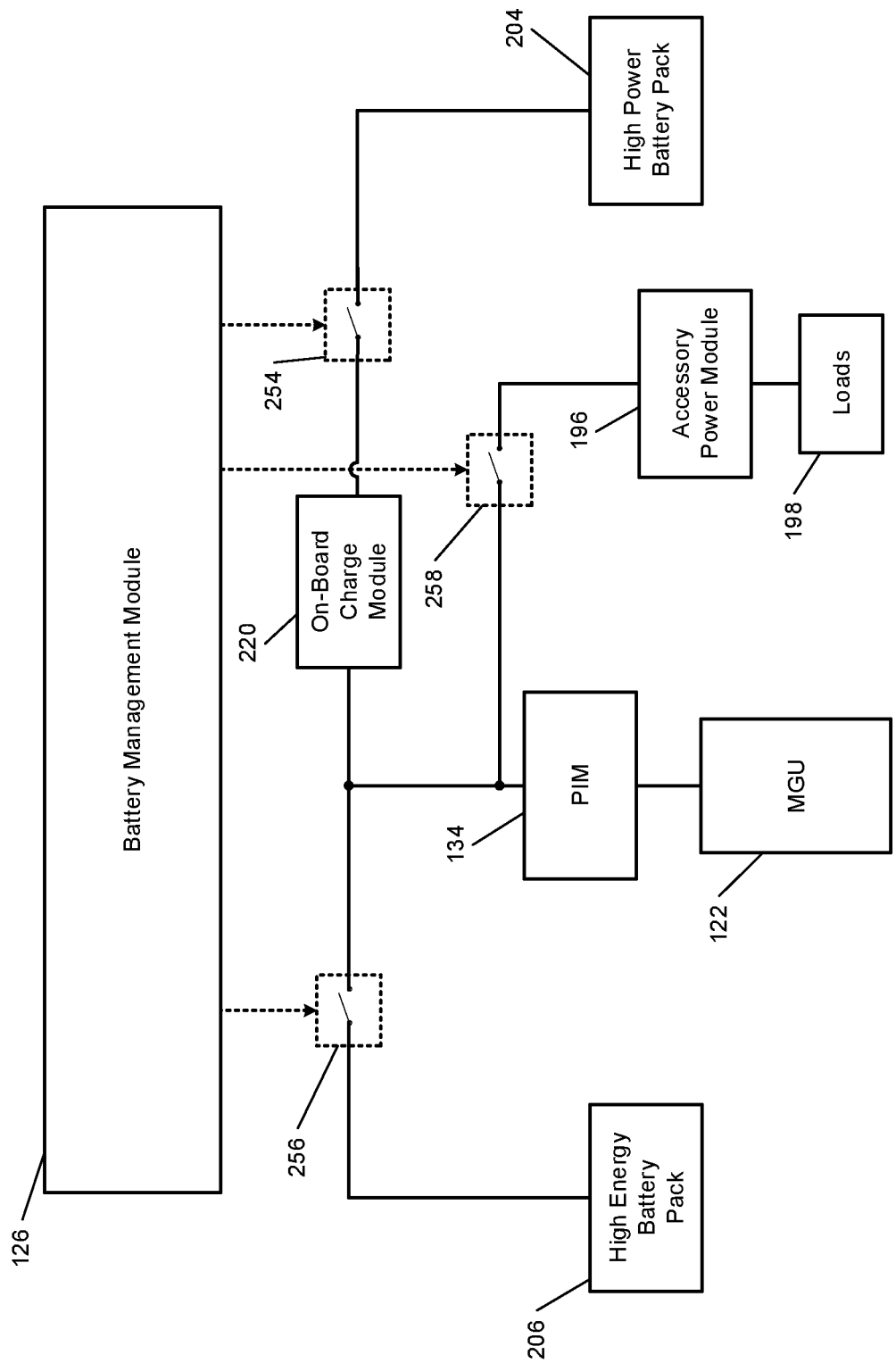
FIG. 3 is a functional block diagram of an example energy share system.

Referring now to FIG. 3, a functional block diagram of the energy share system is shown. An on-board charge module 220 converts alternating current (AC) received from a charge station to direct current (DC), via an AC/DC converter and charges the high power battery pack 204 and the high energy battery pack 206. The on-board charge module 220 also detects when the vehicle is plugged into a charge station and what type of charge station the vehicle has been plugged into.

A first switch 254 operatively connected to the high power battery pack 204 and a second switch 256 is operatively connected to the high energy battery pack 206. The first switch 254 may also be referred to as the high power battery pack switch and the second switch 256 may also be referred to as the high energy battery pack switch.

When the first switch 254 is open, the high power battery pack 204 is disconnected from the MGU 122 and from on-board charge module 220. When the first switch 254 is closed, the high power battery pack 204 is operatively connected to the MGU 122 (during drive mode) and to the on-board charge module 220 (during charge mode). When the second switch 256 is open, the high energy battery pack 206 is disconnected from the MGU 122 and from the on-board charge module 220. When the second switch 256 is closed, the high energy battery pack 206 is operatively connected to the MGU 122 (during drive mode) and to the on-board charge module 220 (during charge mode).

The first switch 254 and the second switch 256 are both shown in open positions in FIG. 3. The battery management module 126 is operatively connected to each of the first switch 254 and the second switch 256 and is configured to control switching of the first switch 254 and the second switch 256 independently of one another. The first switch 254 and the second switch 256 may be placed in the open position, both the first switch 254 and the second switch 256 may be placed in the closed position, the first switch 254 may be placed in the open position and the second switch 256 may be placed in the closed position, or vice versa. The high power battery pack 204 may be discharged without discharging the high energy battery pack 206, and the high energy battery pack 206 may be discharged without discharging the high power battery pack 204.

The high power battery pack 204 may also be used to charge the high energy battery pack 206 and the high energy battery pack 206 may be used to charge the high power battery pack 204. For example, when the high power battery pack 204 is supplying the MGU 122 with power (i.e., the first switch 254 is closed), the second switch 256 may also be closed so that the high power battery pack 204 charges the high energy battery pack 206.

The MGU 122 may be driven via power from the high power battery pack 204 and/or the high energy battery pack 206 depending on the respective positions of the first switch 254 and the second switch 256. Alternatively, the MGU may charge the high power battery pack 204 and/or the high energy battery pack 206, depending on the respective positions of the first switch 254 and the second switch 256. The MGU 122 may be an alternating current (AC) motor or another suitable type of motor. The PIM 134 is shown disposed between the MGU 122 and the first switch 254 and the second switch 256.

The energy management system may also include a third switch 258 used to control current flow to the accessory power module 196 which supplies the accessory load 198. The third switch 258 is operatively connected to the battery management module 126. The battery management module 126 controls switching of the third switch 258. When the third switch 258 is in the closed position, current generated by the MGU 122 during operation as a generator (during regenerative braking) is provided to the accessory load 198 on the vehicle, such as an electrically-powered vehicle accessory. During regenerative braking, the battery management module 126 may close the third switch 258 such that current flows to the accessory load 198. This may be used to avoid high currents that damage the cells of the high energy battery pack 206.

Figure 4:
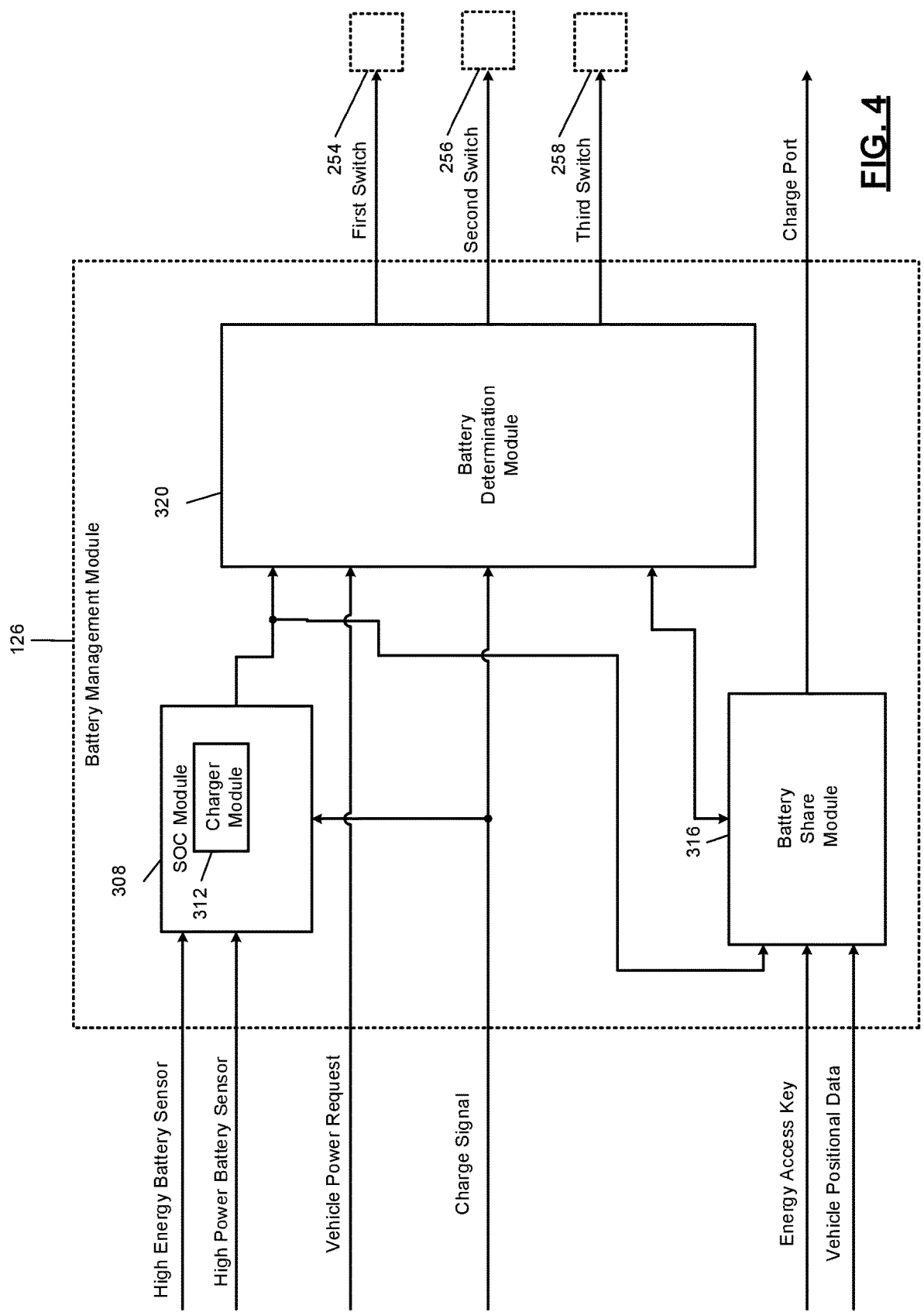
FIG. 4 is a functional block diagram of an example battery management module.

FIG. 4 shows a functional block diagram of an example implementation of the battery management module 126. The battery management module 126 may include a state-of-charge (SOC) module 308, a battery share module 316, and a battery determination module 320. The SOC module 308 estimates the SOC for the high power battery pack 204 and the high energy battery pack 206 based on the data from the sensors 233. The SOC module 308 may determine the SOC of the high power battery pack 204 and the high energy battery pack 206 based on the voltages of the high power battery pack 204 and high energy battery pack 206. For example, the SOC module 308 may determine the SOCs using one of a lookup table and an equation that relates voltages of the high power battery pack 204 and high energy battery pack 206 to the SOCs.

The SOC module 308 may determine the SOCs, additionally or alternatively, based on the current to and from the high power battery pack 204 and the high energy battery pack 206. For example, the SOC module 308 may determine a mathematical integral of current over each predetermined period and add the integration results to determine the SOC of that battery pack. As another example, the SOC module 308 may scale or offset the voltage based on the current, the scalar of offset determined based on the current, and determine the SOC using one of a lookup table and an equation that relates these scaled or offset voltages to the SOCs of the high power battery pack 204 and the high energy battery pack 206. The SOC module 308 may determine the SOCs further based on a temperature of the high power battery pack 204 and the high energy battery pack 206. The temperature may be, for example, measured using one or more temperature sensors. The SOCs may be provided as a percentage between 0 percent SOC indicative of 0 charge (i.e., fully discharged) and 100 percent SOC indicative of the high power battery pack 204 and the high energy battery pack 206 being fully charged.

The SOC module 308 includes a charger module 312. The charger module 312 monitors the SOC of each of the high power battery pack 204 and the high energy battery pack 206 and determines when the high power battery pack 204 and the high energy battery pack 206 are fully charged. The charger module 312 also charges the high power battery pack 204 and the high energy battery pack 206 in a way that helps to extend the lifetime of the high power battery pack 204 and the high energy battery pack 206. For example, during the charging process, when the high energy battery pack 206 is fully charged, the charger module 312 instructs the battery determination module 320 to open the second switch 256 to prevent any more flow of energy to the high energy battery pack 206. Similarly, during the charging process, when the high power battery pack 204 is fully charged, the charger module 312 instructs the battery determination module 320 to open the first switch 254 to prevent any more flow of energy to the high power battery pack 204.

The battery share module 316 enables energy sharing between vehicles such as energy of a buyer's vehicle (hereinafter "the buyer") and energy from a seller's vehicle (hereinafter "the seller"). The battery share module 316 receives vehicle positional data (geographical coordinates of the vehicle), the SOC data for the high power battery pack 204 and the high energy battery pack 206, and transmits the vehicle positional data and the SOC data to an energy share server. The battery share module 316 may periodically update and retransmit SOCs of the high power battery pack 204 and the high energy battery pack 206 of the seller's vehicle.

The battery share module 316 may also receive and transmit data to a computing device, such as an energy access key. The energy access key controls access to a charge port of the seller's vehicle. The energy access key includes an amount of energy to be transferred and a time period for which the energy access key is valid. The charge port may include an electronic lock that may be locked and unlocked by the energy access key. For example, the buyer may establish a communication link between a computing device of the buyer and a seller's vehicle using Bluetooth Low Energy (BLE) communication. The buyer may transmit the energy access key to the seller's vehicle using the BLE commination link. The CAN network 162 of the seller's vehicle may be woken up in response to receiving the energy access key and unlock the charge port of the vehicle upon successful authentication of the energy access key. During an energy transfer transaction, the battery share module 316 monitors the SOC of the high power battery pack 204 and the high energy battery pack 206 to determine when the amount of energy specified in the energy access key has been transferred to the buyer's vehicle. The battery share module 316 instructs the battery determination module 320 to open the first switch 254 and/or the second switch 256 to prevent further energy transfer.

The battery determination module 320 selectively controls discharging and charging of the high power battery pack 204 and the high energy battery pack 206 based on the SOCs for the high power battery pack 204 and the high energy battery pack 206, a vehicle power request (VPR), a characteristic of the charge station, and the energy access key. The VPR includes a present amount of power required to meet vehicle operator speed and acceleration commands. For example, depression or lifting of an accelerator pedal, the rate of depression or lifting of the accelerator pedal, depression or lifting of a braking pedal, the rate of depression or lifting of the braking pedal, and wheel speed data may be used by the engine control module to determine the VPR. For example, if the VPR determined is non-zero, (i.e., the MGU 122 is required to function as a motor), then power is required from the hybrid battery pack 144. However, if the VPR is zero, then the MGU 122 is not required to function as a motor.

The battery determination module 320 selectively controls discharging and charging of the high power battery pack 204 and the high energy battery pack 206 by opening and closing the first switch 254 and the second switch 256, respectively. For example, in response to the SOC of the high power battery pack 204 being less than a predetermined minimum threshold, the battery determination module 320 may open the first switch 254 so that no further power is allowed to flow from the high power battery pack 204 and close the second switch 256 so that any additional VPR requests are fulfilled by the high energy battery pack 206.

The battery determination module 320 selectively enables charging of the high energy battery pack 206 with the high power battery pack 204. For example, when the vehicle is in a driving mode, the SOC of the high energy battery pack 206 is greater than a first predetermined minimum threshold, for example 0 percent, and the SOC of the high energy battery pack 206 is less than a second predetermined minimum threshold, for example 80 percent, the battery determination module 320 closes the first switch 254 and the second switch 256. The vehicle may be in driving mode when the vehicle is utilizing energy from the hybrid battery pack 144 to propel the vehicle.

Figure 5:
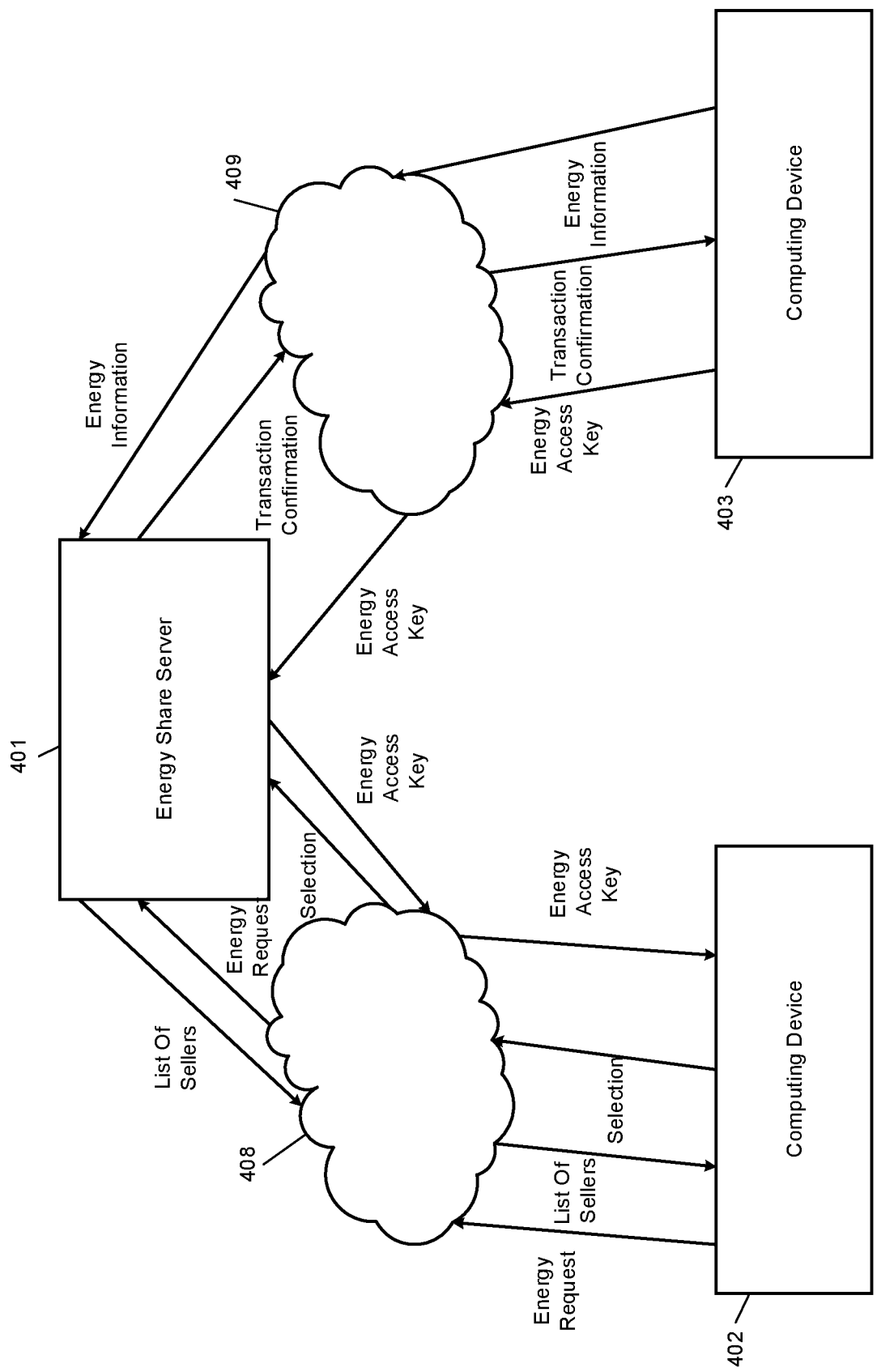
FIG. 5 is a functional block diagram of an example energy share system.

FIG. 5 is a functional block diagram of an example energy sharing system. An energy share server 401 facilitates the sale of energy between vehicles. A buyer transmits an energy request to the energy share server 401 using a computing device, such as computing device 402. Examples of computing devices include mobile phones, tablet devices, laptop computers, desktop computers, and other types of computing devices. Computing devices 402 and 403 and the energy share server 401 communicate via one or more networks 408 and 409. The networks 408 and 409 may include wireless networks, wired networks, or a combination of wireless and wired networks. While the example is provided that the buyer submits the energy request via the computing device 402, in some implementations the buyer may submit the energy request directly via the infotainment module 182 of the vehicle. In this manner, the infotainment module 182 of the vehicle is considered to be a computing device.

The energy request may include a location of the buyer (e.g., geographical coordinates), the amount of energy that the buyer is requesting to purchase, a distance the buyer is willing to travel to purchase the energy, a current range remaining based on the SOC of the high power battery pack 204 and the high energy battery pack 206, and a maximum price the buyer is willing to pay per unit of energy and other suitable information.

The seller, through the computing device 403, transmits energy information to the energy share server 401. The energy information may include: a location of the seller (e.g., geographical coordinates) how much energy the seller has available for sale, a minimum price the seller is willing to sell the energy for per unit, an estimated range remaining for the vehicle based on the SOC of the high power battery pack 204 and the high energy battery pack 206 of the seller's vehicle, and a time frame for which the seller is willing to sell energy. The seller may manually enter the amount of energy available for sale or the amount of energy may be periodically updated based on the SOC of the high power battery pack 204 and the high energy battery pack 206 of the seller's vehicle.

Based on the energy request, the energy share server 401 determines a list of potential sellers that meet the criteria contained in the energy request. For example, the energy share server 401 may include in the list of potential sellers, all vehicles within the distance that the buyer is willing to travel, that have the requested amount of energy available, and that are willing to sell the energy for less than the maximum price the buyer is willing to pay per unit of energy.

In response to receiving the list of potential sellers, the buyer is able to select one of the sellers from the list. The buyer transmits a selection of the seller from the list of potential sellers to the energy share server 401. In response to the buyer's selection, the energy share server 401 transmits a transaction confirmation notification to the seller confirming the details of the transaction such as the amount of energy to be transferred, a price at which the buyer has agreed to purchase the energy for, and a location where the transfer is to take place (if different from the seller's location). Upon receiving the transaction confirmation, the seller transmits the energy access key to the energy share server 401 which then transmits the energy access key to the buyer. The buyer can then use the energy access key to unlock the charge port of the seller's vehicle and charge the buyer's vehicle with the requested amount of energy from the seller's vehicle. While the example is provided that the buyer's vehicle is equipped with a hybrid battery pack of the present disclosure, the buyer's vehicle may be equipped with any suitable battery back such as only a high power battery back or only a high energy battery pack.

Figure 7:
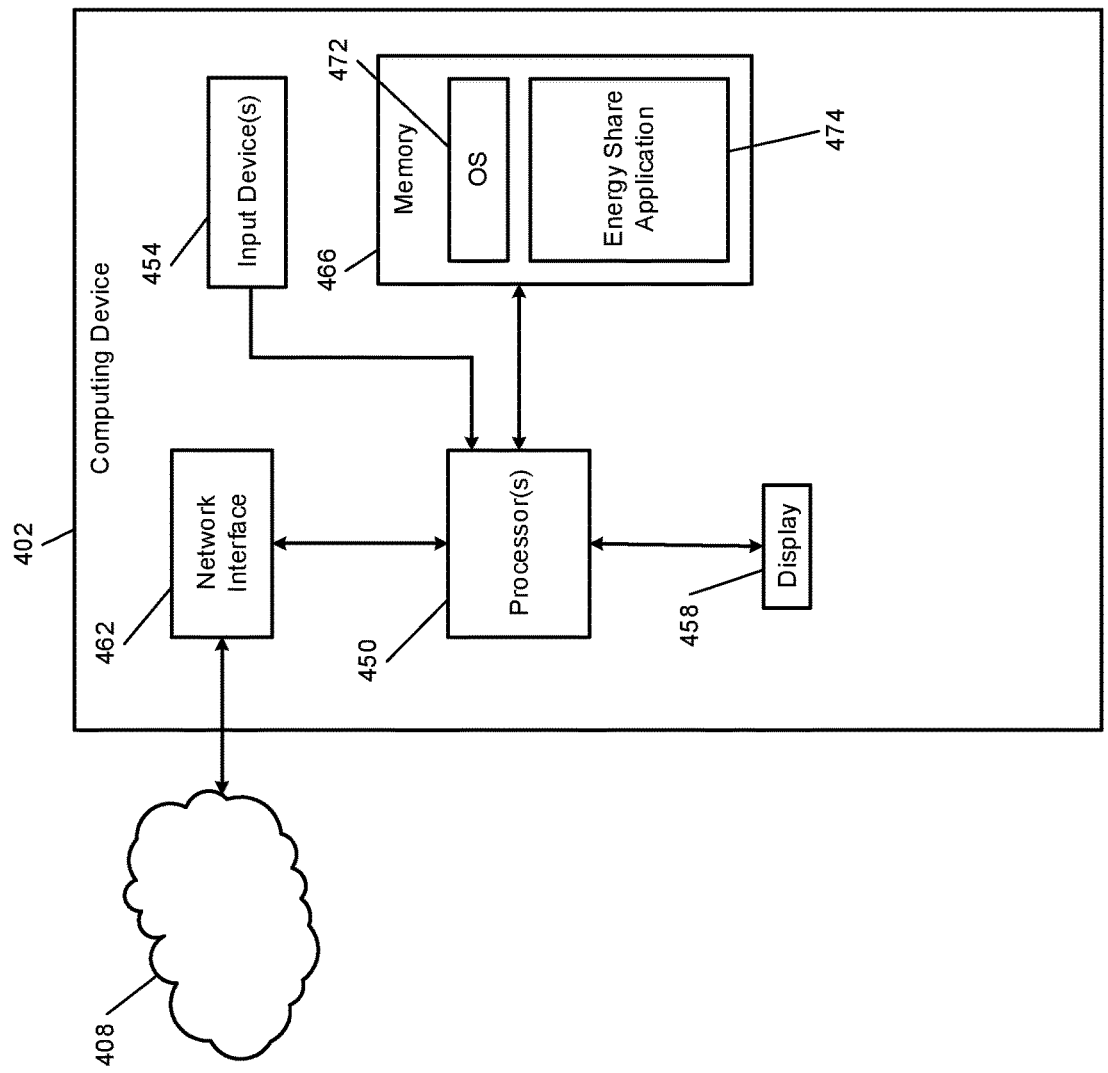
FIG. 7 is a functional block diagram of an example implementation of a computing device.
Figure 6:
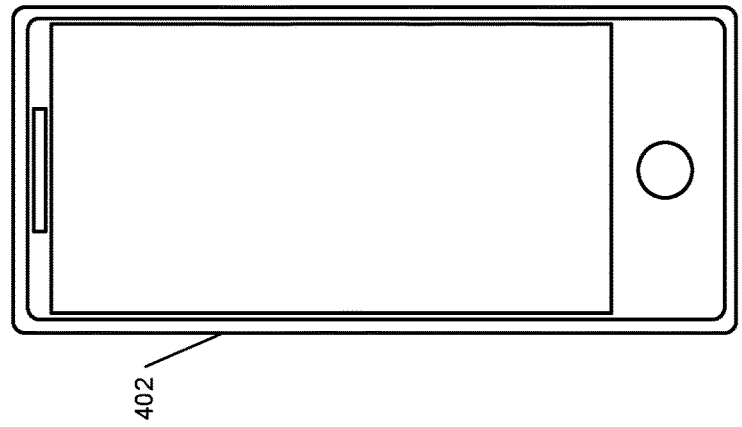
FIG. 6 is a front view of an example implementation of a computing device.

FIG. 6 includes a front view of an example implementation of the computing device 402. FIG. 7 includes a functional block diagram of an example implementation of the computing device 402. Referring now to FIGS. 6 and 7, the computing device 402 includes a central processing unit (CPU) or processor 450, one or more input devices 454 (e.g., touchscreen display, a microphone, one or more switches, etc.), a display 458 (e.g., the touchscreen display), one or more other output devices (not shown), a network interface 462, and memory 466. While the input devices 454 and the display 458 are illustrated as components of the computing device 402, input devices and output devices (e.g., a display) may be peripheral devices. Also, while the example of a single processor is provided, the computing device 402 may include two or more processors.

The network interface 462 connects the computing device 402 to the networks 408. For example, the network interface 462 may include a wired interface (e.g., an Ethernet interface) and/or a wireless interface (e.g., a Wi-Fi, Bluetooth, near field communication (NFC), or other wireless interface). The processor 450 of the computing device 402 executes an operating system (OS) 472 and one or more other applications. The processor 450 executes an operating system (OS) 472 and one or more server applications, such as an energy share application 474 to display user interfaces for generating and transmitting energy requests. Operations discussed herein as being performed by the computing device 402 are performed by the computing device 402. Although the computing device 402 is described in FIGS. 6 and 7, the computing device 403 may be similarly configured.

Figure 8:
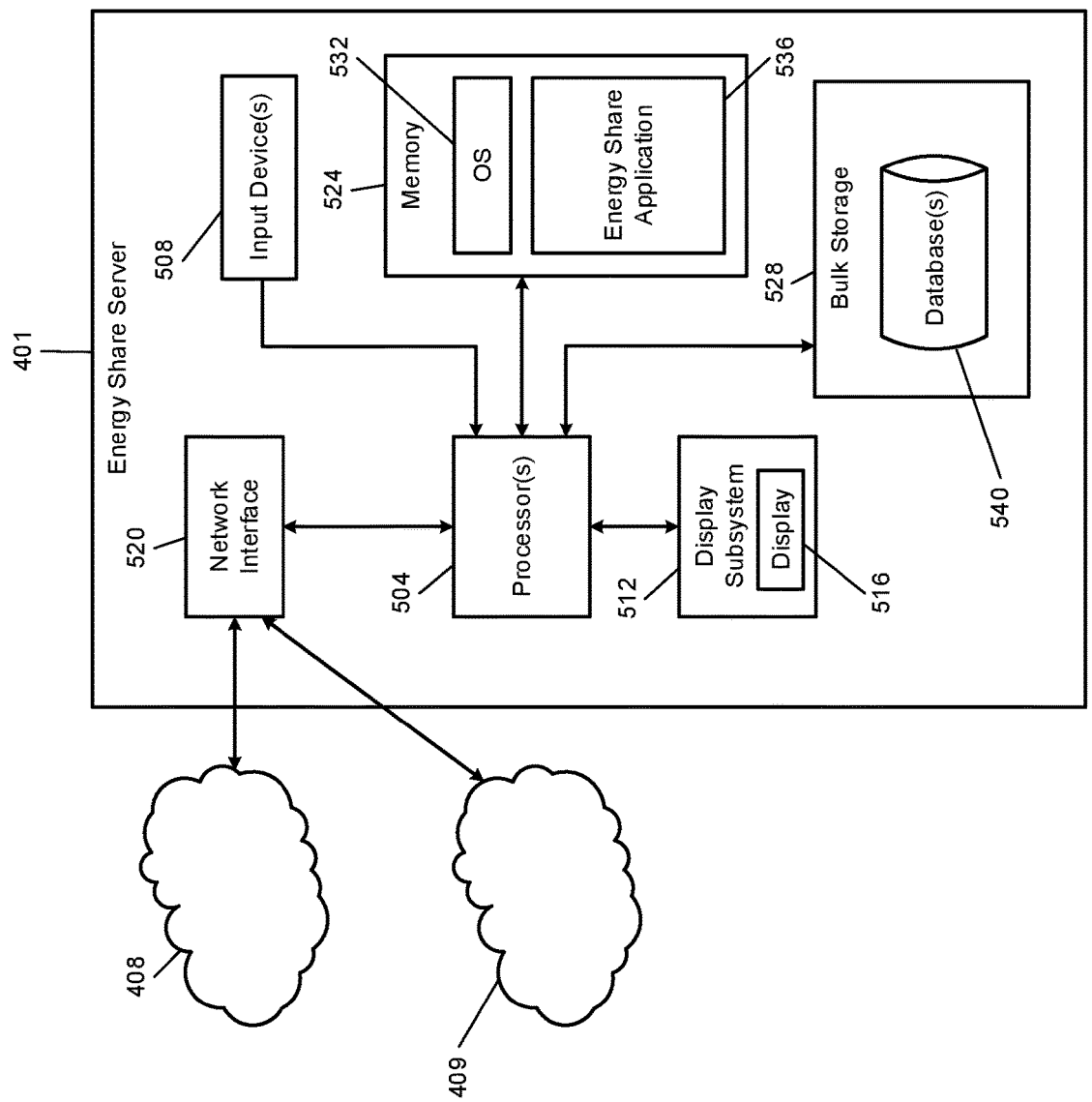
FIG. 8 is a functional block diagram of an example implementation of an energy share server.

FIG. 8 includes a simplified functional block diagram of an example implementation of the energy share server 401. The energy share server 401 includes a processor 504, one or more input devices 508 (e.g., a keyboard, touchpad, mouse, etc.), a display subsystem 512 including a display 516, a network interface 520, a memory 524, and a bulk storage 528. While the input devices 508 and the display 516 are illustrated as components of the energy share server 401, input devices and output devices (e.g., a display) may be peripheral devices. Also, while the example of a single processor is provided, the energy share server 401 may include two or more processors.

The network interface 520 connects the energy share server 401 to the computing devices 402 and 403 via the networks 408 and 409. For example, the network interface 520 may include a wired interface (e.g., an Ethernet interface) and/or a wireless interface (e.g., a Wi-Fi, Bluetooth, near field communication (NFC), or other wireless interface). The memory 524 may include volatile or nonvolatile memory, cache, or other type of memory. The bulk storage 528 may include flash memory, one or more hard disk drives (HDDs), or other bulk storage device.

The processor 504 executes an operating system (OS) 532 and one or more server applications, such as an energy share application 536. The bulk storage 528 may store one or more databases 540 that store data structures used by the energy share server 401 applications to perform functions described herein. The processor 504 executes the energy share application 536 to facilitate energy sharing between the buyer and the seller. Operations discussed herein as being performed by the energy share server 401 are performed by the energy share server 401 (more specifically the processor 504) during execution of the energy share application 536. While functions described herein as being performed by the energy share server 401, functionality of the energy share server 401 may distributed amongst two or more servers.

Figure 9:
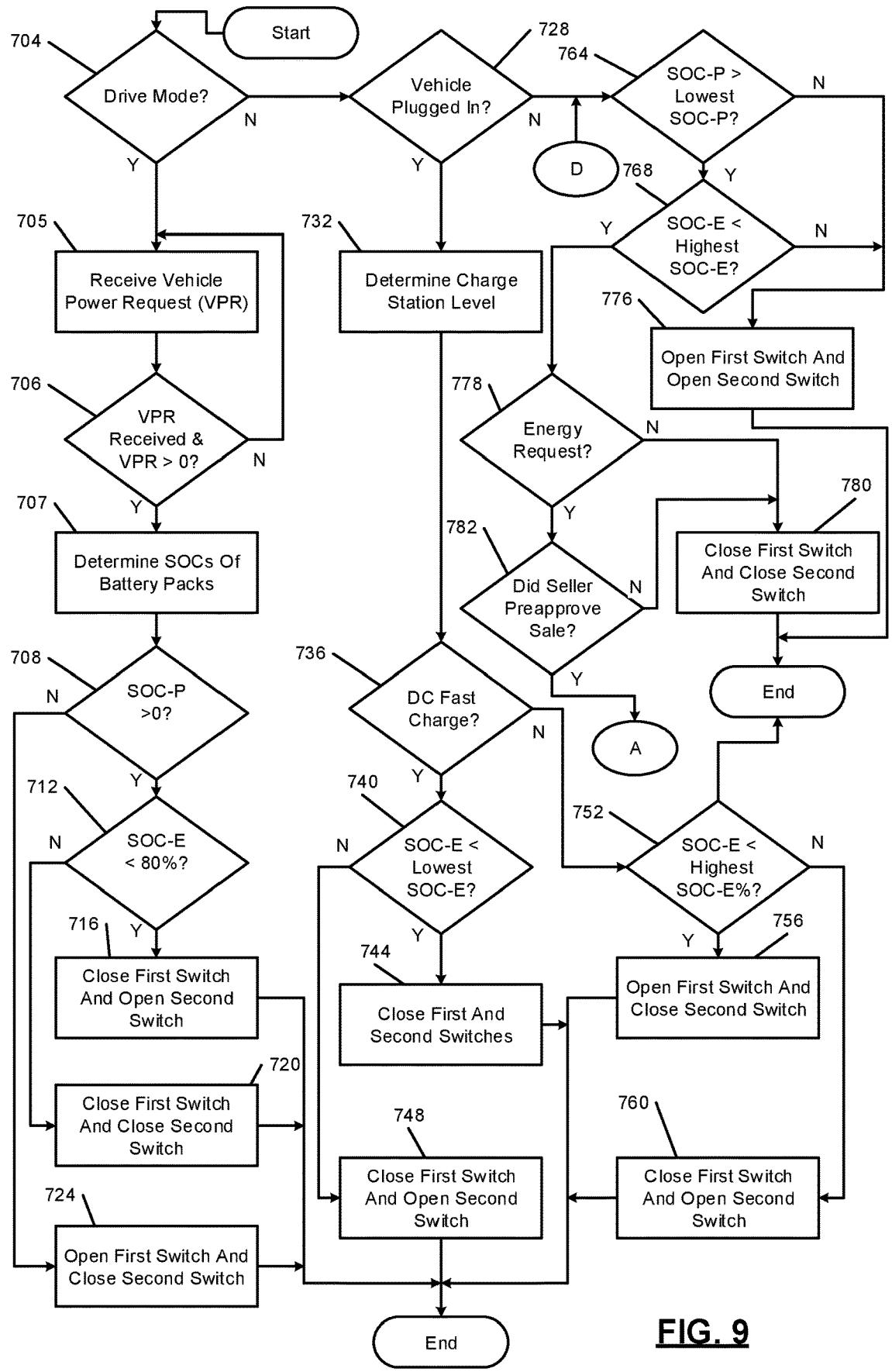
FIG. 9 is a flowchart depicting an example method of charging and discharging the hybrid battery pack.
Figure 10:
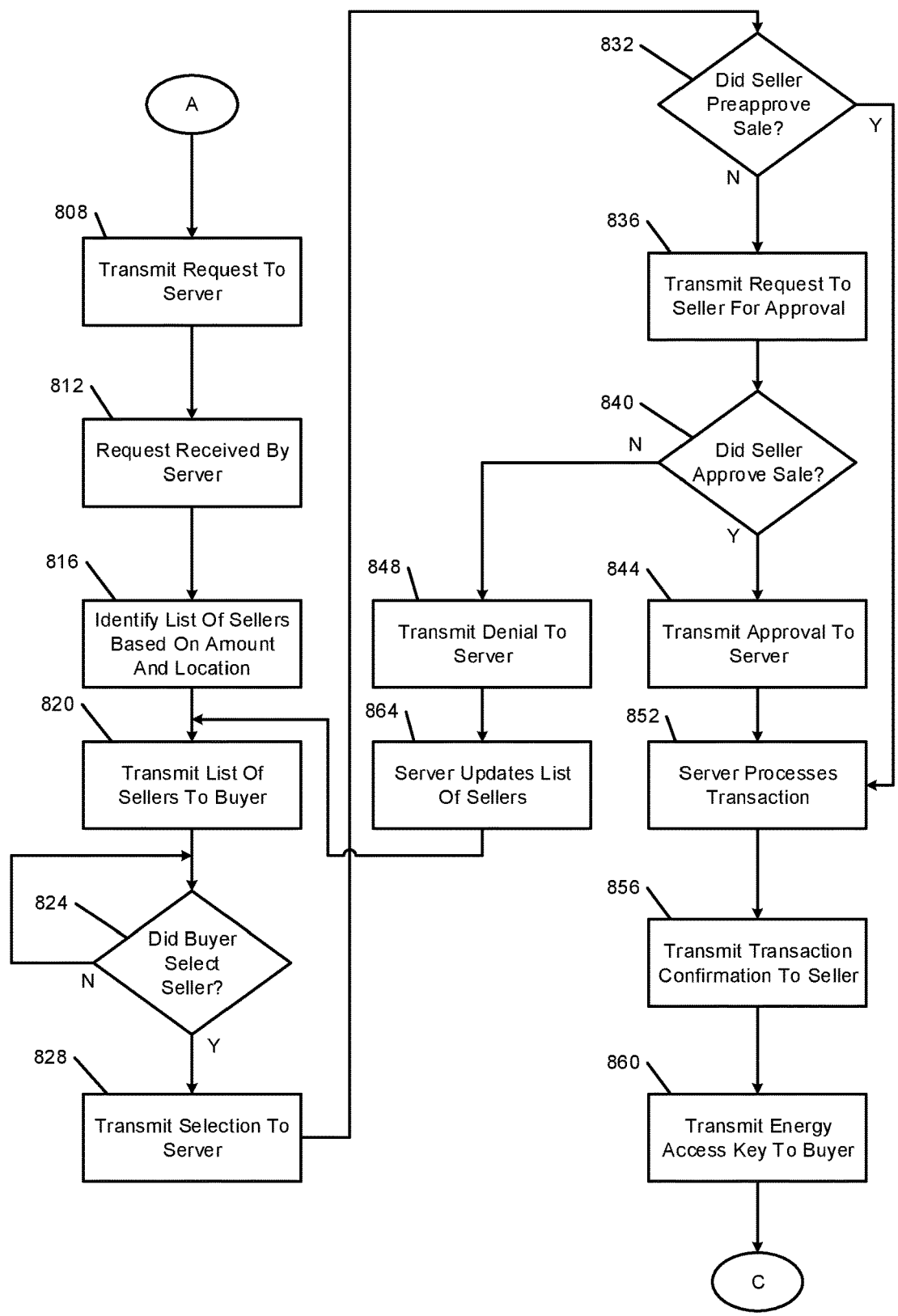
FIG. 10 is a flowchart depicting an example method of transmitting and receiving an energy request.
Figure 11:
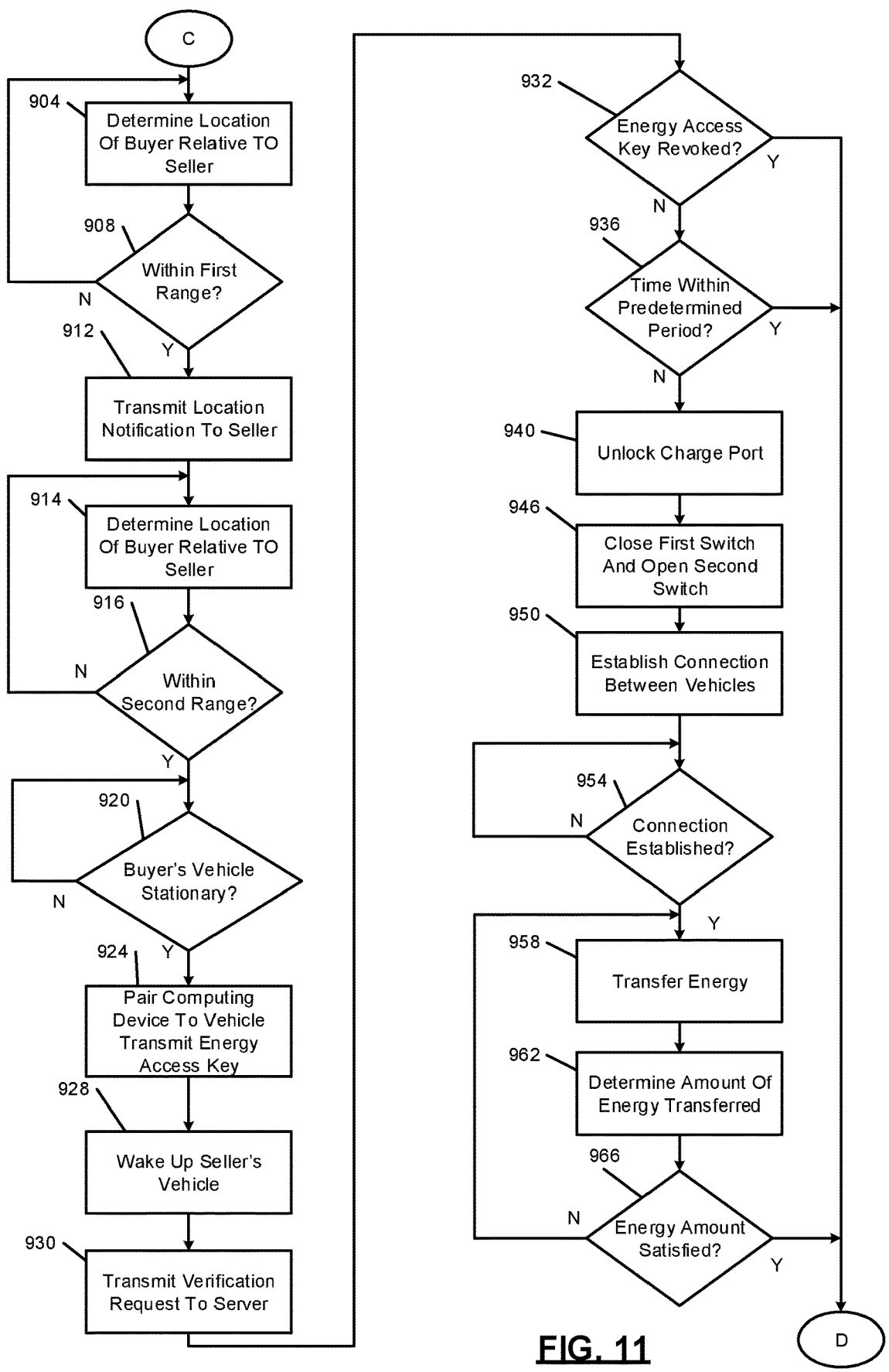
FIG. 11 is a flowchart depicting an example method of fulfilling an energy request.

FIGS. 9-11 depict example control operations performed by the battery management module 126. At 704, control determines whether the vehicle is in driving mode. If control determines that the vehicle is in driving mode, control continues at 705. If control determines that the vehicle is not in driving mode, control continues at 728.

At 705, control receives the (VPR) and control continues at 706. At 706, control verifies that the VPR has been received and is greater than zero. If so, control continues at 707; otherwise, control returns to 705. At 707, control determines the SOCs of the high power battery pack 204 and the high energy battery pack 206. At 708, control determines whether the SOC of the high power battery pack 204 is greater than a first predetermined SOC or a similar predetermined SOC. If so, control continues at 712; otherwise, control continues at 724. At 712, control determines whether the SOC of the high energy battery pack 206 is less than a second predetermined SOC, for example 80 percent. If so, control transfers to 720; otherwise, control continues at 716.

At 716, control closes the first switch 254 (if previously open) and opens the second switch 256 (if previously closed) so that just the high power battery pack 204 is supplying the MGU 122 with power and control may end. While the example of ending is provided, control illustrates a continuous control loop, and control may continue back at 704. At 720, control closes the first switch 254 (if previously open) and also closes the second switch 256 (if previously open) so that the high power battery pack 204 is supplying the MGU with power and also charging the high energy battery pack 206 and control may end. At 724, control opens the first switch 254 (if previously closed) and closes the second switch 256 (if previously open) so that the high energy battery pack 206 is supplying the MGU 122 with power and control may end.

At 728, control determines whether the vehicle is plugged into a charge station. If so, control continues at 732; otherwise, control continues at 764. At 732, control determines a charge level characteristic of the charge station. At 736, control determines whether the charge station is a level 3 charge station (i.e., DC fast charge). If so, control continues at 740; otherwise, control continues at 752. At 740, control determines whether the SOC of the high energy battery pack 206 is less than a third predetermined SOC for the high energy battery pack 206. For example, the third predetermined SOC for the high energy battery pack 206 may be set to 30 percent or another suitable percentage. If so, control continues at 744; otherwise, control continues at 748. At 744, control closes the first switch 254 (if open) and the second switch 256 (if open) to enable DC fast charging of both the high power battery pack 204 and the high energy battery pack 206 and control may end. At 748, control closes the first switch 254 (if opened) and opens the second switch 256 (if closed) to enable DC fast charging on only the high power battery 204.

At 752, control determines whether the SOC of the high energy battery pack 206 is less than a fourth predetermined SOC for the high energy battery pack 206. The fourth predetermined SOC is greater than the third predetermined SOC. If so, control continues at 756; otherwise, control continues at 760. At 756, control opens the first switch 254 (if closed) and closes the second switch 256 (if opened) so that the high energy battery pack 206 is charged before the high power battery pack 204 and control may end. At 760, control closes the first switch 254 (if opened) and opens the second switch 256 (if closed) so that the high power battery pack 204 is charged first and control may end.

At 764, control determines whether the SOC of the high power battery 204 is greater than a fifth predetermined SOC for the high power battery 204. If so, control continues at 768; otherwise, control continues at 776. At 768, control determines whether the SOC of the high energy battery pack 206 is less than the fourth predetermined SOC for the high energy battery pack 206. If so, control continues at 778; otherwise, control continues at 776. At 776, control opens the first switch 254 (if closed) and opens the second switch 256 (if closed). At 778, control determines whether an energy request has been received. If so, control continues at 782; otherwise, control continues at 780. At 780, control closes the first switch (if open) and also closes the second switch (if open) to enable changing of the high energy battery pack 206 with the high power battery pack 204. At 782, control determines whether the seller has agreed to energy sharing (that is, whether the seller has preapproved energy request sales). If so, control continues at letter A of FIG. 10, otherwise, control continues at 780.

Referring to FIG. 10, at 808, control transmits the energy request to the energy share server 401 and control continues at 812. At 812, the energy request is received by the energy share server 401 and control continues at 816. At 816, the energy share server 401 identifies a list of sellers based on the amount of energy requested and based on a location of the buyer. At 820, control transmits a list of the potential sellers to the buyer and control continues at 824.

At 824, control determines whether the buyer has selected a seller from the list of potential sellers. If so, control continues at 828; otherwise, control waits for the buyer to select a seller. At 828, the buyer's selection is transmitted to the energy share server 401 and control continues at 832. At 832, control determines whether the seller has preapproved energy sales. If so, control continues at 852; otherwise, control continues at 836. At 836, control transmits the energy request to the seller for approval. Control continues at 840, where control determines whether the seller has approved the sale. If so, control continues at 844; otherwise, control continues at 848. At 844, control transmits the seller's approval to the energy share server 401. At 848, control transmits the seller's denial to the energy share server 401 and continues at 864. At 864, the energy share server 401 updates the list of sellers and returns to 820.

Control continues at 852, where the energy share server 401 processes the energy transfer transaction and continues to 856. At 856, control transmits confirmation of the seller's approval to the buyer. Control continues to 860, where control transmits the energy access key to the buyer through the energy share server 401 and control continues at letter C of FIG. 11.

Referring to FIG. 11, at 904, control determines a location of the buyer's vehicle relative to the seller's vehicle. For example, the buyer's vehicle may transmit the location of the buyer's vehicle once every predetermined period. At 908, control determines whether the distance between the buyer's vehicle and the seller's vehicle is within a first predetermined range. If so, control continues at 912; otherwise, control returns back to 904. At 912, control transmits a location notification to the seller indicating that the buyer's vehicle is within a certain distance of the seller's vehicle. Control continues at 914, where control determines a second distance between the buyer's vehicle and the seller's vehicle. At 916, control determines whether the second distance is within a second predetermined range. If so, control continues at 920; otherwise, control returns to 916. At 920, control determines whether the buyer's vehicle has stopped (i.e., the vehicle is stationary). If so, control continues at 924; otherwise, control returns to 920.

At 924, control pairs the buyer's computing device 402 to the seller's vehicle using BLE communication and transmits the energy access key to the seller's vehicle. At 928, the seller's vehicle is woken up in response to receiving the energy access key. At 930, the computing device 403 transmits an energy access key verification request to the energy share server 401. Control continues at 932, where the energy share server 401 verifies whether the energy access key is still valid (i.e., the seller has not revoked access). If so, control continues at 936; otherwise, control may end. At 936, control determines whether a current time is within a predetermined time period specified by the energy access key. For example, the energy access key may be valid from 2:00 PM to 5:00 PM. If the current time is 8:00 PM, the energy access key is no longer valid. If so, control continues at 940; otherwise, control may end.

At 940, control unlocks the charge port on the seller's vehicle. At 946, control closes the first switch 254 and opens the second switch 256 so that only the high power battery pack 204 transfers energy to the buyer's vehicle. At 950, control establishes a connection between the buyer's vehicle and the seller's vehicle. For example, the buyer may establish a direct connection with the charge port on the seller's vehicle using a bidirectional charge connector. At 954, control verifies that the buyer's vehicle and the seller's vehicle have established a connection. If so, control continues at 958; otherwise, control returns to 954. At 958, control begins transferring energy and control continues at 962. At 962, control determines the amount of energy transferred. At 966, control determines if the amount of energy transferred satisfies the amount of energy specified in the energy access key. If so, control may end or continue to letter D of FIG. 9; otherwise, control may return back to 958.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle comprising:
a hybrid battery pack including a first battery pack and a second battery pack, wherein:
the first battery pack has a higher energy density than the second battery pack; and
the second battery pack has a higher power density than the first battery pack;
a power inverter module that is connected between the hybrid battery pack and a motor generator unit (MGU) that is connected to a powertrain of the vehicle and that is configured to regulate power flow between the hybrid battery pack and the MGU;
a battery management module configured to:
control switching of the power inverter module;
selectively charge and discharge at least one of the first battery pack and the second battery pack; and
selectively charge the first battery pack with power from the second battery pack;
a first switch that is connected between the power inverter module and the second battery pack and that:
(i) when open, disconnects the second battery pack from at least one of the power inverter module and a charging station; and
(ii) when closed, connects the second battery pack and at least one of the power inverter module and the charging station; and
a second switch that is connected between the power inverter module and the first battery pack and that:
(i) when open, disconnects the first battery pack from at least one of the power inverter module and the charging station; and
(ii) when closed, connects the first battery pack and at least one of the power inverter module and the charging station.

2. The vehicle of claim 1 wherein the battery management module is further configured to:
determine a first state-of-charge (SOC) of the first battery pack; and
determine a second SOC of the second battery pack.

3. The vehicle of claim 2 wherein the battery management module is configured to, based on at least one of the first SOC and the second SOC, charge and discharge at least one of the first battery pack and the second battery pack.

4. The vehicle of claim 3 wherein:
the battery management module is configured to discharge the second battery pack when: (i) the vehicle is in a driving mode; (ii) the second SOC of the second battery pack is greater than a first predetermined SOC; and (iii) the first SOC of the first battery pack is less than a second predetermined SOC; and
the battery management module is configured to charge the first battery pack with power discharged from the second battery pack when: (i) the vehicle is in the driving mode; (ii) the second SOC of the second battery pack is greater than a third predetermined SOC; and (iii) the first SOC of the first battery pack is greater than a fourth predetermined SOC.

5. The vehicle of claim 4 wherein the battery management module is configured to discharge the first battery pack in response to determining that the second SOC of the second battery pack is less than the first predetermine SOC.

6. The vehicle of claim 2 wherein:
the battery management module is configured to determine whether the vehicle is plugged into a charging station; and the battery management module is configured to determine a level of the charge station in response to determining that the vehicle is plugged into the charging station.

7. The vehicle of claim 6 wherein:
the battery management module is configured to, in response to determining that the charge station is a level three charging station, determine whether the first SOC of the first battery pack is less than a first predetermined SOC for the first battery pack;
the battery management module is configured to charge at least one of the second battery pack and the first battery pack with power from the charging station in response to determining that the first SOC of the first battery pack is less than the first predetermined SOC for the first battery pack; and
the battery management module is configured to charge the second battery pack with power from the charging station in response to determining that the first SOC of the first battery pack is greater than the first predetermined SOC for the first battery pack.

8. The vehicle of claim 7 wherein:
the battery management module is configured to, in response to determining that the charging station is not a level three charging station, determine whether the first SOC of the first battery pack is less than a second predetermined SOC for the first battery pack,
wherein the second predetermined SOC is greater than the first predetermined SOC;
the battery management module is configured to charge the first battery pack with power from the charging station in response to determining that the first SOC of the first battery pack is less than the second predetermined SOC for the first battery pack; and
the battery management module is configured to charge the second battery pack in response to determining that the first SOC of the first battery pack is greater than or equal to the second predetermined SOC for the first battery pack.

9. The vehicle of claim 6 wherein:
the battery management module is configured to, in response to determining that the vehicle is not plugged into the charging station, determine whether the second SOC of the second battery pack is greater than a first predetermined SOC for the second battery pack and whether the first SOC of the first battery pack is less than a second predetermined SOC for the first battery pack; and
the battery management module is configured to, in response to determining that at least one of (a) the second SOC of the second battery pack is less than the first predetermined SOC for the second battery pack and (b) the first SOC of the first battery pack is greater than the second predetermined SOC for the first battery pack, at least one of (i) disable discharging of the second battery pack and (ii) disable discharging of the first battery pack.

10. The vehicle of claim 9 wherein the battery management module is configured to:
determine whether an energy request has been received in response to determining that the second SOC of the second battery pack is greater than the first predetermined SOC for the second battery pack and the first SOC of the first battery pack is less than the second predetermined SOC for the first battery pack; and
in response to determining that the energy request has been received, at least one of (i) enable charging of the first battery pack with power from the second battery pack and (ii) selectively discharge the second battery pack to satisfy the energy request.

11. An energy share system comprising:
the vehicle of claim 10;
a second vehicle including a battery pack and a second battery management module,
wherein at least one of:
the second battery management module is configured to selectively charge the battery pack with power received from the hybrid battery pack of the vehicle; and
the battery management module is configured to selectively charge the hybrid battery pack with power received from the battery pack of the second vehicle.

12. The energy share system of claim 11 further comprising:
a first computing device that is associated with the vehicle and that is configured to, in response to receiving a first input from a user, transmit an energy request and a first location of the vehicle;
a second computing device that is associated with the second vehicle and that is configured to:
transmit a second location of the second vehicle; and
an amount of energy available for sale from the battery pack of the second vehicle.

13. The energy share system of claim 12 further comprising an energy share server configured to:
receive the energy request, the first location of the vehicle, the second location of the second vehicle, and the amount of energy available for sale from the battery pack of the second vehicle;
generate a list of energy sellers' vehicles in response to the receipt of the energy request; and
transmit the list to the first computing device;
wherein the first computing device is configured to:
display the list on a display of the first computing device; and
transmit, to the energy share server, an indication of selection of the second vehicle in response to receipt of user input at the first computing device indicative of the selection of the second vehicle from the list; and
wherein the battery management module is configured to selectively charge the hybrid battery pack with power received from the battery pack of the second vehicle in response to signals from the energy share server.

14. The energy share system of claim 13 wherein the energy share server is configured to limit the list of energy sellers' vehicles to energy sellers' vehicles that are within a predetermined distance of a location of the vehicle.

15. The energy share system of claim 14 wherein the energy request includes the location of the vehicle and the predetermined distance,
wherein the first computing device is configured to adjust the predetermined distance based on user input to the first computing device.

16. The energy share system of claim 13 wherein:
the second vehicle includes a charge port;
the charge port controls access to the battery pack and includes an electronic lock;
the energy share server selectively transmits an electronic access key to the first computing device in response to the indication of selection of the second vehicle in response to receipt of user input at the first computing device indicative of the selection of the second vehicle from the list; and the electronic lock unlocks in response to the electronic access key.

17. The energy share system of claim 16 wherein:
the electronic access key includes an amount of energy to be transferred from second battery pack; and
wherein the battery management module is configured to charge the hybrid battery pack with power received from the battery pack of the second vehicle until an amount of energy transferred from the battery pack is equal to the amount of energy to be transferred from the battery pack.

18. The energy share system of claim 16 wherein:
the electronic access key includes predetermined times between which the electronic access key is valid; and
wherein the battery management module is configured to charge the hybrid battery pack with power received from the battery pack of the second vehicle only when a present time is between the predetermined times.

19. A method for a vehicle, comprising:
regulating, by a power inverter module, power flow between a hybrid battery pack and a motor generator unit (MGU) wherein:
   the hybrid battery pack includes a first battery pack and a second battery pack,
   the first battery pack has a higher energy density than the second battery pack, and
   the second battery pack has a higher power density than the first battery pack;
controlling switching of the power inverter module;
selectively charging and discharging at least one of the first battery pack and the second battery pack;
selectively charging the first battery pack with power from the second battery pack;
selectively opening and closing a first switch that is connected between the power inverter module and the second battery pack, the first switch:
   (i) when open, disconnecting the second battery pack from at least one of the power inverter module and a charging station; and
   (ii) when closed, connecting the second battery pack and at least one of the power inverter module and the charging station; and
selectively opening and closing a second switch that is connected between the power inverter module and the first battery pack, the second switch:
   (i) when open, disconnecting the first battery pack from at least one of the power inverter module and the charging station; and
   (ii) when closed, connecting the first battery pack and at least one of the power inverter module and the charging station.

* * * * *